Dec. 3, 1940.    R. G. LE TOURNEAU    2,223,375
CONNECTING MEANS FOR TRACTOR AND IMPLEMENT UNITS
Filed Sept. 18, 1939
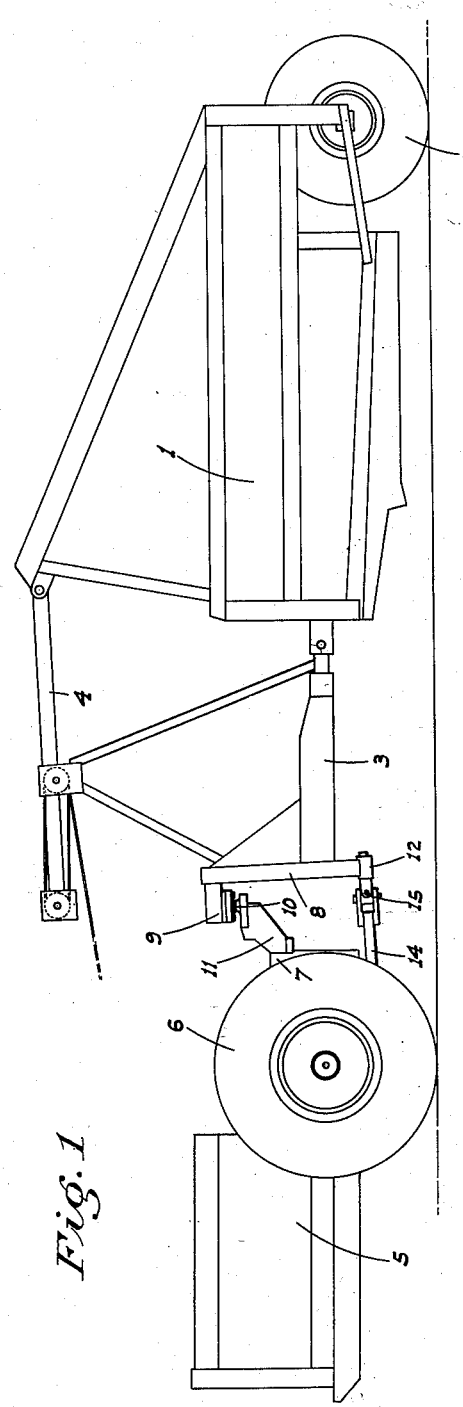
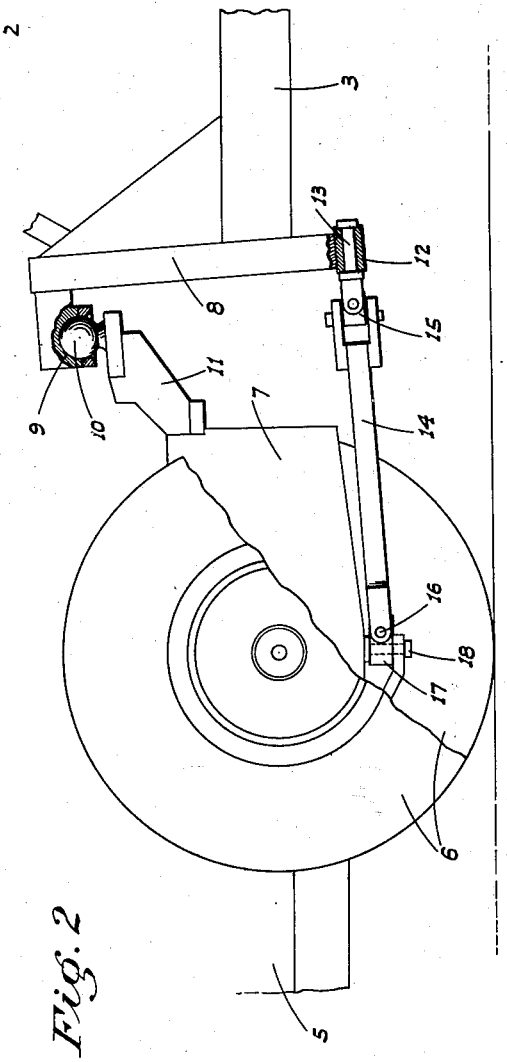
INVENTOR.
R. G. LeTourneau
BY
ATTORNEY Patented Dec. 3, 1940

2,223,375

UNITED STATES PATENT OFFICE 2,223,375

CONNECTING MEANS FOR TRACTOR AND IMPLEMENT UNITS

Robert G. Le Tourneau, Peoria, Ill., assignor to R. G. Le Tourneau, Inc., a corporation of California Application September 18, 1939, Serial No. 295,460

3 Claims. (Cl. 280—33.44)

This invention relates to the combination scraper and tractor unit shown in my allowed application for patent Serial No. 193,913, filed March 4, 1938, and particularly deals with the means to flexibly connect the tractor with the swivelly mounted tongue of the scraper.

The principal object of the present invention is to provide an improved connecting means between the tractor and tongue so arranged that the trailer may tilt laterally relative to the tractor, as uneven ground conditions may necessitate, without the use of any loose sliding play between the connecting members being necessary as was the case with the structure of said allowed application, and which resulted in excessive wear.

The above object is accomplished by means of such structure and relative arrangement of parts as will fully appear by a perusal of the following specification and claims.

In the drawing similar characters of reference indicate corresponding parts in the several views:

Figure 1 is a side outline of a combination scraper and tractor unit, showing the improved connecting means between the tractor and the draft tongue of the scraper.

Figure 2 is an enlarged fragmentary side view, partly broken out and in section, showing the improved connecting means more in detail.

Referring now more particularly to the characters of reference on the drawing, the scraper as here shown is substantially the same as that depicted in said allowed application, and includes a body 1 tiltably supported by rear wheels 2 and having a draft tongue 3 pivoted thereon for swivel movement in a vertical plane and whose movement is controlled by a cable actuated mechanism 4 substantially as before shown and claimed.

The tractor 5 is also of the same type as that previously disclosed and includes a single pair of supporting wheels 6 adjacent its rear end between which is disposed the transmission housing 7 of the tractor; this housing also constituting a part of the frame of the tractor.

The tongue 3 at its forward end is rigid with an upstanding post 8, which on its upper end is provided with a forwardly projecting downwardly facing socket 9 which turnably engages a ball 10 supported from a bracket 11 mounted on and projecting rearwardly from housing 7 at the top.

At its lower end, the post supports a bearing sleeve 12 in which a spindle 13 is turnably mounted; the axis of the spindle extending lengthwise of the tongue. The pin is connected with the rear end of a drawbar 14 by means of a universal joint or double swivel connection 15 of common character, and which is substantially in vertical alinement with the ball 10. At its forward end, the drawbar is pivoted by a transverse pin 16 on a block 17 which in turn is pivoted on the housing 7 by a vertical pin 18, thus forming a double-swivel connection.

By reason of this construction, it will be seen that the main load is taken by the ball 10, which is of sufficient size to sustain such load. The drawbar of course serves to prevent relative tilting of the tongue relative to the tractor in a vertical plane. At the same time, any lateral tilting of the tractor relative to the tongue and post, and which throws the lower end of the latter out of its normal alinement in a vertical transverse plane, may take place without any binding or distorting action on the drawbar.

This is due to the use of the double swivel connections at both ends of the drawbar, which allow the same to swing laterally and also vertically the slight distance necessary to compensate for the difference in the level of the lower end of the post relative to the ball about which the post relatively swings with any lateral tilt. The spindle 13 which is actualy a part of the rear universal joint 15, of course prevents any possible twisting or binding of the joint parts or the drawbar as the latter swings laterally.

From the foregoing description it will be readily seen that I have produced such a device as substantially fulfills the objects of the invention as set forth herein.

While this specification sets forth in detail the present and preferrred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In the combination of a tractor and draft unit which includes a tractor frame and a draft tongue projecting rearwardly from the frame and adapted at its rear end for connection with a vehicle; a post rigid with the tongue at its forward end, a ball and socket joint connecting the frame and post at the upper end of the latter and an additional connecting device between the frame and the lower end of the post, said device including pivots arranged to allow of limited lateral movement of the lower end of the post combined with a change of level relative to the ball joint while maintaining the post and frame in inflexible relation as to movement in a vertical plane.

2. In the combination of a tractor and draft unit which includes a tractor frame and a draft tongue projecting rearwardly from the frame and adapted at its rear end for connection with a vehicle; a post rigid with the tongue at its forward end, a ball and socket joint connecting the frame and post at the upper end of the latter, a draft bar extending forwardly from the post, a universal joint connection between the rear end of the bar and the post at its lower end and a double swivel connection between the draft bar at its forward end and the tractor frame at a point ahead of the ball and socket joint.

3. In the combination of a tractor and draft unit which includes a tractor frame and a draft tongue projecting rearwardly from the frame and adapted at its rear end for connection with a vehicle; a post rigid with the tongue at its forward end, a ball and socket joint connecting the frame and post at one end of the latter, a draft bar extending forwardly from the post, a universal joint between the bar at its rear end and the other end of the post, and a double swivel connection between the draft bar at its forward end and the tractor frame at a point thereon ahead of the ball and socket joint.

ROBERT G. LE TOURNEAU.